US012659185B2

(12) United States Patent
Hirano

(10) Patent No.: US 12,659,185 B2
(45) Date of Patent: Jun. 16, 2026

(54) CONTROL DEVICE AND CONTROL METHOD

(71) Applicant: DENSO CORPORATION, Kariya-city (JP)

(72) Inventor: Takahiro Hirano, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 376 days.

(21) Appl. No.: 18/461,583

(22) Filed: Sep. 6, 2023

(65) Prior Publication Data

US 2024/0106677 A1 Mar. 28, 2024

(30) Foreign Application Priority Data

Sep. 26, 2022 (JP) ................................. 2022-152720

(51) Int. Cl.
*H04L 12/40* (2006.01)

(52) U.S. Cl.
CPC .... *H04L 12/40* (2013.01); *H04L 2012/40215* (2013.01)

(58) Field of Classification Search
None
See application file for complete search history.

(56) References Cited

U.S. PATENT DOCUMENTS

| | | | | | |
|---|---|---|---|---|---|
| 9,229,521 | B2 * | 1/2016 | Furuya | .................. | G06F 1/3234 |
| 9,798,602 | B2 * | 10/2017 | Furuya | .................. | G06F 1/3203 |
| 10,346,231 | B2 * | 7/2019 | Furuya | ................ | G06F 11/0757 |
| 10,846,950 | B2 * | 11/2020 | Brent | .................. | H04N 13/189 |

| | | | | | |
|---|---|---|---|---|---|
| 2013/0015797 | A1 | 1/2013 | Itou | | |
| 2013/0198539 | A1 * | 8/2013 | Furuya | ................ | G06F 11/0721 |
| | | | | | 713/502 |
| 2016/0077909 | A1 * | 3/2016 | Furuya | .................. | G06F 1/3203 |
| | | | | | 714/55 |
| 2018/0032391 | A1 * | 2/2018 | Furuya | .................. | G06F 11/079 |
| 2019/0019353 | A1 * | 1/2019 | Brent | ..................... | G07C 5/008 |
| 2022/0077034 | A1 * | 3/2022 | Matsubara | .......... | H10W 70/411 |
| 2022/0077035 | A1 * | 3/2022 | Matsubara | .......... | H10W 90/811 |
| 2022/0077037 | A1 * | 3/2022 | Osumi | ............... | H10W 70/411 |
| 2023/0411281 | A1 * | 12/2023 | Tanaka | ................ | H10W 20/497 |

FOREIGN PATENT DOCUMENTS

| | | |
|---|---|---|
| JP | 2004-122942 A | 4/2004 |
| JP | 2014-032558 A | 2/2014 |

OTHER PUBLICATIONS

U.S. Appl. No. 18/461,626, filed Sep. 6, 2023, Hirano et al.

* cited by examiner

*Primary Examiner* — Jay P Patel
(74) *Attorney, Agent, or Firm* — Posz Law Group, PLC

(57) ABSTRACT

A control device includes a first circuitry that executes a process for communicating with another device, and a second circuitry that executes a reset of the first circuitry. The first circuitry executes an initial diagnosis which is a self-diagnosis immediately after activation of the first circuitry, and outputs a predetermined signal to the second circuitry when the first circuitry is determined to be normal in the initial diagnosis. The second circuitry prohibits a communication output caused by an operation of the first circuitry to the other device in at least a time period from a start of the reset of the first circuitry to a timing at which the predetermined signal is output from the first circuitry for the first time after the start of the reset. The second circuitry permits the communication output when confirming that the predetermined signal is output.

4 Claims, 4 Drawing Sheets

TIME

CONTROL DEVICE AND CONTROL METHOD

CROSS REFERENCE TO RELATED APPLICATION

This application is based on and incorporates herein by reference Japanese Patent Application No. 2022-152720 filed on Sep. 26, 2022.

TECHNICAL FIELD

The present disclosure relates to a control device and a control method.

BACKGROUND

An ECU mounted on a vehicle includes a microcontroller communicates with other units via a CAN driver.

SUMMARY

According to at least one embodiment, a control device includes a first circuitry and a second circuitry.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
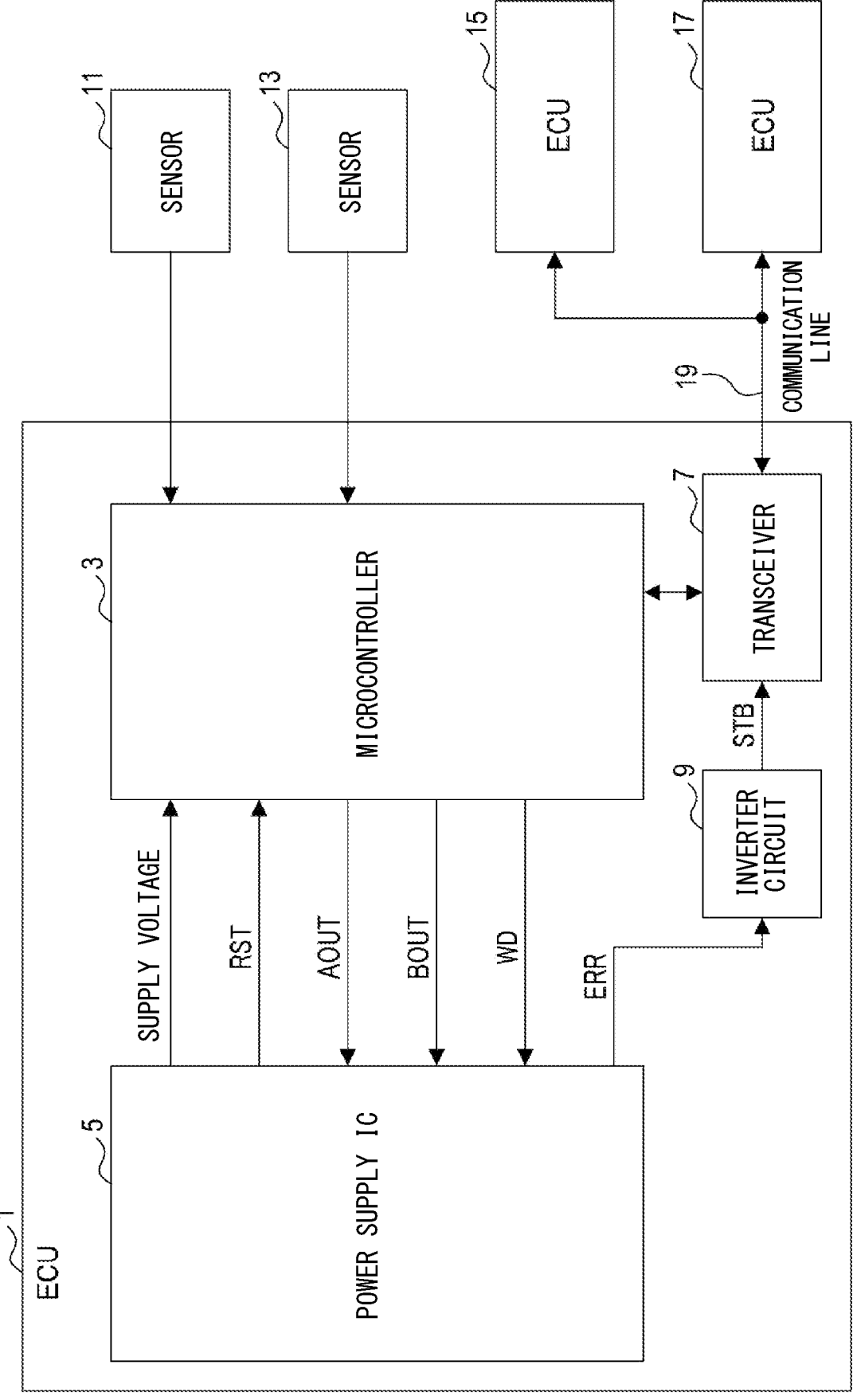
FIG. 1 is a block diagram illustrating a configuration of an ECU according to an embodiment.

A comparative example will be described. An ECU mounted on a vehicle according to the comparative example includes a main microcontroller communicates with other units via a CAN driver. The ECU is an abbreviation for "Electronic Control Unit". CAN is an abbreviation for "Controller Area Network". CAN is a registered trademark.

In the ECU of the comparative example, a sub microcontroller monitors the operation of the main microcontroller based on a program run pulse from the main microcontroller. When the main microcontroller is abnormal, the sub microcontroller outputs an output prohibition signal to the CAN driver to prohibit a communication output. The main microcontroller and the sub microcontroller are simultaneously reset by a power supply IC having a watchdog timer.

In the ECU of the comparative example, the main microcontroller serving as a controller that performs processing for communicating with another unit is reset. After the reset is released, the main microcontroller that has not yet been normalized may output an indefinite communication signal to the CAN driver. Then, the indefinite communication signal may be transmitted to another unit, that is, an indefinite communication output may be transmitted to another unit.

In contrast, according to the present disclosure, a control device and a control method is capable of reducing an indefinite communication output at time of activation of a controller due to release of reset of the controller.

A control device according to an aspect of the present disclosure includes a controller configured to execute a process for communicating with at least another device, and a monitoring unit configured to execute a reset of the controller when a predetermined reset condition relating to the controller is satisfied.

The controller is configured to execute an initial diagnosis, which is a self-diagnosis immediately after activation of the controller, after the reset of the controller by the monitoring unit is released, and output a predetermined signal indicating a normal operation of the controller to the monitoring unit when the controller is determined to be normal in the initial diagnosis.

The monitoring unit is configured to prohibit a communication output caused by an operation of the controller to the other device in at least a time period from a start of the reset of the controller to a timing at which the predetermined signal is output from the controller for the first time after the start of the reset, and permit the communication output when confirming that the predetermined signal is output.

According to this configuration, after the release of the reset of the controller, it is confirmed in the initial diagnosis of the controller that the controller can normally operate. Then, the communication output to the other device due to the operation of the controller is permitted. Therefore, indefinite communication output to the other device can be reduced at the time of activation caused by the release of the reset of the controller.

Hereinafter, an embodiment of the present disclosure will be described with reference to the drawings.

An ECU 1 of the embodiment shown in FIG. 1 is mounted on a vehicle, and includes a microcontroller (microcomputer) 3 that controls an operation of the ECU 1, a power supply IC 5 that supplies power to the microcontroller 3 and monitors the operation of the microcontroller 3, a transceiver 7, and an inverter circuit 9. The microcontroller 3 may be a so-called SoC. SoC is an abbreviation for "System on a Chip". The microcontroller 3 is an example of a first circuitry configured to execute a process for communicating with at least another device, and the power supply IC 5 is an example of a second circuitry configured to execute a reset of the first circuitry when a predetermined reset condition relating to the first circuitry is satisfied.

Information from one or more sensors 11, 13 mounted on the vehicle is input to the ECU 1. The sensors 11, 13 may be sensors for detecting information related to the vehicle, and may be, for example, peripheral monitoring sensor devices such as a camera or a millimeter wave radar for detecting information around the vehicle. The ECU 1 is communicably connected to other ECUs 15, 17 via a communication line 19. The ECUs 15, 17 are mounted on the vehicle.

The microcontroller 3 has at least functions of receiving input information from the sensors 11, 13, integrating or dividing the input information, and transmitting the information to the other ECUs 15, 17. Therefore, the microcontroller 3 performs a process for communicating with at least the other ECUs 15, 17. Further, the microcontroller 3 may have a function of transmitting update data of control contents to the other ECUs 15, 17.

The microcontroller 3 is connected to the communication line 19 via the transceiver 7.

The transceiver 7 converts a transmission signal (i.e., a signal of transmission data) output from the microcontroller 3 into a transmission signal conforming to a communication protocol, and outputs the transmission signal to the communication line 19. Further, the transceiver 7 converts a transmission signal from the communication line 19 into a reception signal (i.e., a signal of reception data) that can be input to the microcontroller 3 based on the communication protocol, and outputs the reception signal to the microcontroller 3. Therefore, the microcontroller 3 can communicate with the other ECUs 15, 17 via the transceiver 7. The communication protocol is, for example, CAN, but may be other than CAN.

For example, the ECU 15 may be configured to execute control for providing information, such as the surroundings of the vehicle and an alarm, to a driver of the vehicle on the basis of information transmitted from the microcontroller 3. For example, the ECU 17 may be configured to control power, braking, steering, and the like of the vehicle based on information transmitted from the microcontroller 3.

Further, the transceiver 7 is configured to stop when a standby signal STB input from the inverter circuit 9 becomes high in active level. Therefore, when the standby signal STB becomes high, the transceiver 7 stops at least an output of the signal to the communication line 19 (i.e., communication output).

The inverter circuit 9 is configured to logically invert an error signal ERR output from the power supply IC 5 and output a logically inverted signal to the transceiver 7 as the standby signal STB.

Therefore, when the error signal ERR from the power supply IC 5 is at low level, the communication output from the transceiver 7, that is, the communication output to the other ECUs 15, 17 is forcibly prohibited regardless of the operation of the microcontroller 3.

The power supply IC 5 generates a power supply voltage for operating the microcontroller 3 from a voltage of an in-vehicle battery (not shown), and supplies the power supply voltage to the microcontroller 3.

Figure 4:
FIG. 4 is a time chart illustrating an operation example of the embodiment.

The power supply IC 5 monitors the operation of the microcontroller 3, and resets the microcontroller 3 when a predetermined reset condition is satisfied. Specifically, as shown in FIG. 4, the power supply IC 5 resets the microcontroller 3 by setting a reset signal RST to the microcontroller 3 at low in active level for a predetermined hold time TH. The reset condition is a condition in which the power supply IC 5 determines that the microcontroller 3 is abnormal.

After the reset by the power supply IC 5 is released, the microcontroller 3 executes an initial diagnosis which is a self-diagnosis immediately after activation.

When the microcontroller 3 determines that the microcontroller 3 is normal in the initial diagnosis, the microcontroller 3 starts a normal operation, and executes a process of inputting information from the sensors 11, 13, and a process of transmitting information to the other ECUs 15, 17, for example. On the other hand, when the microcontroller 3 determines that there the microcontroller 3 is abnormal in the initial diagnosis, the microcontroller 3 stops activation.

The microcontroller 3 periodically executes the self-diagnosis during the normal operation. The self-diagnosis periodically executed during the operation of the microcontroller 3 is referred to as an operation diagnosis. The term "periodically" used herein is not limited to fixed time intervals, and may be time intervals different for each time.

The microcontroller 3 executes, for example, a voltage diagnosis and a calculation diagnosis as the operation diagnosis.

In the voltage diagnosis, the microcontroller 3 monitors the power supply voltage in the microcontroller 3, and determines that the voltage is abnormal when the power supply voltage is out of a normal range. This voltage diagnosis is executed by, for example, a circuit block for the voltage diagnosis provided in the microcontroller 3.

The microcontroller 3 sets an abnormality notification signal AOUT transmitted to the power supply IC 5 at low level when the microcontroller 3 determines that the voltage is abnormal in the voltage diagnosis of the operation diagnosis, that is, when the microcontroller 3 detects a voltage abnormality. That is, the low level of the abnormality notification signal AOUT is a signal for notifying the power supply IC 5 of the voltage abnormality in the microcontroller 3.

In the calculation diagnosis, the microcontroller 3 gives a dummy input value to each predetermined calculation process executed by the microcontroller 3, and checks whether or not an output value as a calculation result is equal to a predetermined expected value. When the calculation result is different from the expected value, it is determined that a calculation function is abnormal. This calculation diagnosis is executed by software, for example.

The microcontroller 3 sets an abnormality notification signal BOUT transmitted to the power supply IC 5 at low level when the microcontroller 3 determines that the calculation function is abnormal in the calculation diagnosis of the operation diagnosis, that is, when the microcontroller 3 detects a calculation-function abnormality. That is, the low level of the abnormality notification signal BOUT is a signal for notifying the power supply IC 5 of the calculation-function abnormality in the microcontroller 3.

The initial diagnosis is a diagnosis executed before starting an actual operation of the microcontroller 3 and checking whether or not the microcontroller 3 itself can normally operate. The initial diagnosis includes an initial diagnosis executed by software and an initial diagnosis of hardware such as a memory and a communication module built in the microcontroller 3. The communication module is hardware of the microcontroller 3 for inputting and outputting a transmission signal and a reception signal to and from the transceiver 7.

In the initial diagnosis executed by software, at least a calculation diagnosis same as the calculation diagnosis of the operation diagnosis may be executed, and the calculation diagnosis for processes more than those in the operation diagnosis may be executed. The calculation diagnosis executed as the initial diagnosis by the software may include at least a calculation diagnosis for a process of giving a signal to the communication module to transmit the signal.

Further, the initial diagnosis by the software may include a diagnosis of checking whether the calculation diagnosis functions correctly, that is, a diagnosis of the calculation diagnosis. More specifically, an input value that is expected to be determined as the calculation-function abnormality and an input value that is expected to be determined as a normal value are selectively input to the software that performs the calculation diagnosis, and it is checked whether a determination result as expected is output in each case.

In the initial diagnosis of hardware, for example, in the diagnosis of the communication module, an output path from the communication module to the transceiver 7 is cut off, a predetermined input is given to the communication module, and it is checked whether the output of the communication module reaches a predetermined expected value. Therefore, it is confirmed by the initial diagnosis whether there is at least abnormality in which an indefinite signal is output from the microcontroller 3 to the transceiver 7. In addition, the initial diagnosis of the hardware may include a voltage diagnosis same as the voltage diagnosis of the operation diagnosis.

Further, the initial diagnosis of the hardware may include a diagnosis of whether the voltage diagnosis functions correctly, that is, a diagnosis of the voltage diagnosis. Specifically, an input voltage that is expected be determined to be abnormal and an input voltage that is expected to be determined to be normal are selectively input to the circuit block for the voltage diagnosis, and it is checked whether or not a determination result as expected is output in each case.

When the microcontroller 3 determines that the power supply IC 5 is normal in the initial diagnosis, the microcontroller 3 sets the abnormality notification signals AOUT and BOUT transmitted to the power supply IC 5 from a low level that is a initial setting value initially set by reset to a high level that indicates normal, and then starts outputting a watchdog signal WD described later and starts the normal operation.

When the microcontroller 3 is operating normally, the microcontroller 3 outputs a watchdog signal WD indicating normal operation to the power supply IC 5 according to, for example, the following rules (i) and (ii). Here, the watchdog signal WD from the microcontroller 3 to the power supply IC 5 is a data signal transmitted via serial communication (e.g., SPI communication). SPI is abbreviation for "Serial Peripheral Interface".

(i) The first watchdog signal WD is output within a specified time period from a timing of releasing the reset. The data value of the first watchdog signal WD is set to a predetermined value. The specified time period is longer than a time required for the microcontroller 3 to complete the initial diagnosis.

(ii) After the output of the first watchdog signal WD, the watchdog signal WD is not changed within a first time period (e.g., 10 milliseconds), and the data value of the watchdog signal WD is updated according to a predetermined rule within a second time period (e.g., 5 milliseconds) subsequent to the first time period.

When any one of the following conditions (a) to (c) is satisfied, the power supply IC 5 determines that the reset condition is satisfied and resets the microcontroller 3.

(a) At least one of the abnormality notification signals AOUT and BOUT from the microcontroller 3 changes from the high level to the low level.

(b) After the reset of the microcontroller 3 is released, the first watchdog signal WD, that is, the watchdog signal WD having a predetermined value is not output from the microcontroller 3 until the specified time of the above-described rule (i) has elapsed.

(c) Even when the first watchdog signal WD is output from the microcontroller 3, the subsequent watchdog signal WD does not change according to the above-described rule of (2).

Figure 2:
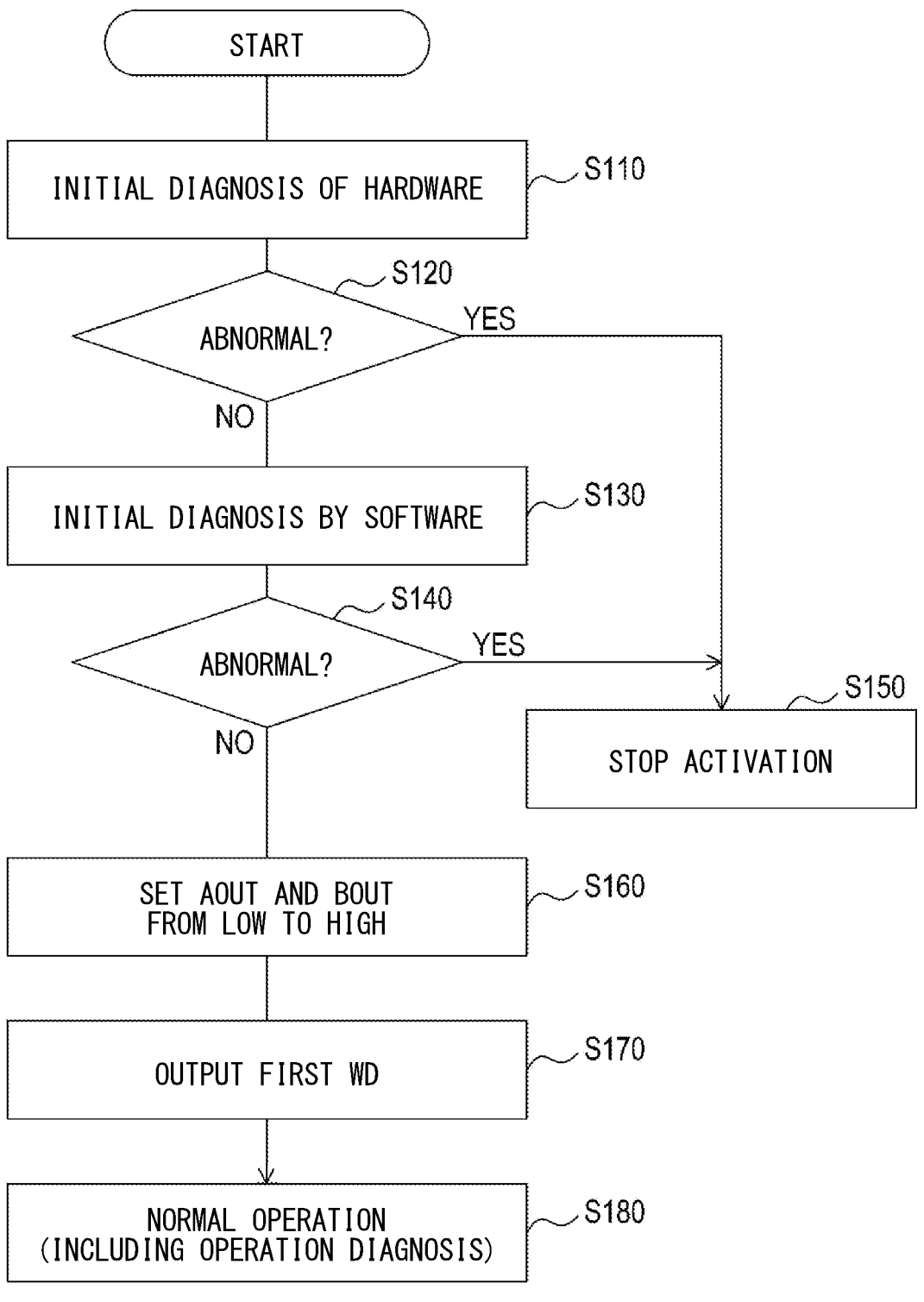
FIG. 2 is a flowchart illustrating a process executed by a microcontroller.

As shown in FIG. 2, when the reset is released by the power supply IC 5, the microcontroller 3 executes the initial diagnosis of the hardware in step S110. In step S120, it is determined whether an abnormality is detected by the initial diagnosis of the hardware. When no abnormality is detected, the process proceeds to step S130.

In step S130, the microcontroller 3 executes the initial diagnosis by the software described above. Then, in step S140, it is determined whether an abnormality is detected by the initial diagnosis by the software. When no abnormality is detected, the process proceeds to step S160.

In step S160, the microcontroller 3 changes the two abnormality notification signals AOUT and BOUT transmitted to the power supply IC 5 from the low level that is the initial value set by the reset to the high level that is the value indicating the normal state. By the reset of the microcontroller 3, the output values of the abnormality notification signals AOUT and BOUT are initially set at the low level. The output values of the abnormality notification signals AOUT and BOUT are set at the high level in step S160.

Then, the microcontroller 3 outputs the first watchdog signal WD to the power supply IC 5 in the next step S170, and then proceeds to step S180 to execute the normal operation. Note that the normal operation mentioned here also includes the operation diagnosis described above.

On the other hand, when the microcontroller 3 determines that an abnormality has been detected in any of steps S120 and S140, that is, when an abnormality has been detected in the initial diagnosis, the microcontroller 3 proceeds to step S150 and stops the activation. That is, the microcontroller 3 intentionally does nothing. Therefore, when an abnormality is detected in the initial diagnosis, the microcontroller 3 is in a state of not outputting at least the watchdog signal WD.

Although FIG. 2 shows that the initial diagnosis of hardware is executed prior to the initial diagnosis by software, the order may be reversed, or both the initial diagnoses may be executed in parallel.

Here, the operation of the power supply IC 5 will be described based on the flowchart of FIG. 3, but the operation of the power supply IC 5 is actually realized by hardware inside the power supply IC 5.

Figure 3:
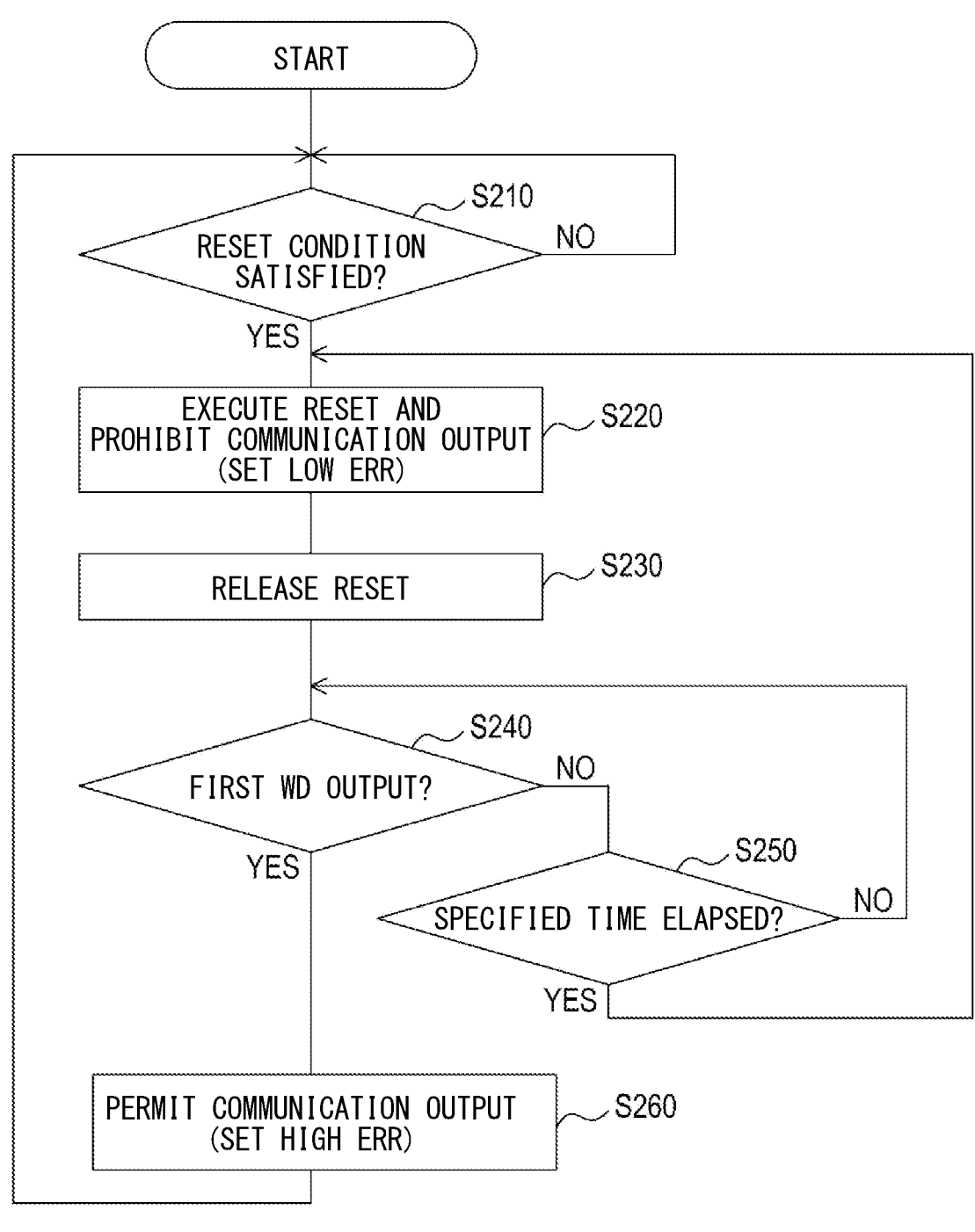
FIG. 3 is a flowchart illustrating an operation of a power supply IC.

As shown in FIG. 3, in step S210, the power supply IC 5 determines whether a reset condition is satisfied. At this step, the microcontroller 3 is not reset. In addition, in step S210, it is determined whether the condition (a) or (c) among conditions (a) to (c) is satisfied.

When the condition (a) or (c) is satisfied, the power supply IC 5 determines that the reset condition is satisfied, and resets the microcontroller 3 in step S220. That is, the reset signal RST transmitted to the microcontroller 3 is set at the low level. Further, in step S220, the power supply IC 5 sets the error signal ERR transmitted to the inverter circuit 9 at the low level to prohibit the communication output from the transceiver 7.

When the predetermined hold time TH elapses after the reset signal RST to the microcontroller 3 is set low, the power supply IC 5 returns the reset signal RST to the high level in step S230. That is, the reset of the microcontroller 3 is released.

Then, in the next step S240, the power supply IC 5 determines whether the first watchdog signal WD is output from the microcontroller 3. When the first watchdog signal WD is not output, the process proceeds to step S250.

The power supply IC 5 may be configured to determine that the first watchdog signal WD has been output at a timing of detection of output of data to a serial communication line that is a line for the watchdog signal WD between the power supply IC 5 and the microcontroller 3. The power supply IC 5 may be configured to determine that the first watchdog signal WD has been output by evaluating the value of the data transmitted through the serial communication line.

In step S250, the power supply IC 5 determines whether the specified time of the rule (1) has elapsed since the reset of the microcontroller 3 is released. When the specified time has not elapsed, the power supply IC 5 returns to step S240 and waits for the first watchdog signal WD from the microcontroller 3. When it is determined in step S250 that the specified time has elapsed, the condition of (b) is satisfied.

Therefore, the process proceeds to step S220, in which the microcontroller 3 is reset and the communication output is prohibited.

When the power supply IC 5 determines that the first watchdog signal WD is output from the microcontroller 3 in step S240, that is, when the first watchdog signal WD is output before a lapse of the specified time from the release of the reset of the microcontroller 3, the process proceeds to step S260. In step S260, the error signal ERR to be transmitted to the inverter circuit 9 is returned from the low level to the high level to permit the communication output from the transceiver 7, and then the process returns to step S210.

Since the power supply IC 5 does not execute the determination in step S210 in a time period from the prohibition of the communication output in step S220 to the permission of the communication output in step S260, the power supply IC 5 does not monitor the abnormality notification signals AOUT and BOUT received from the microcontroller 3. In other words, monitoring of the abnormality notification signals AOUT and BOUT is inactive in this time period from the prohibition to the permission of the communication output.

An example of the above-described operation executed by the microcontroller 3 and the power supply IC 5 will be described with reference to the time chart of FIG. 4.

It is assumed that the microcontroller 3 detects the voltage abnormality in, for example, the voltage diagnosis of the operation diagnosis during the operation, and changes the abnormality notification signal AOUT transmitted to the power supply IC 5 from the high level to the low level at time t1 illustrated in FIG. 4.

Then, the above-described condition (a) is satisfied. Therefore, the power supply IC 5 determines that the reset condition is satisfied, sets the reset signal RST to transmitted to the microcontroller 3 at the low level for the predetermined hold time TH to reset the microcontroller 3, and sets the error signal ERR to be transmitted to the inverter circuit 9 from the high level to the low level. This operation is executed in step S220 of FIG. 3.

When the error signal ERR received from the power supply IC 5 becomes the low level, the communication output from the transceiver 7 is prohibited regardless of what signal the microcontroller 3 outputs to the transceiver 7. Therefore, the communication output from the ECU 1 to the other ECUs 15, 17 due to the operation of the microcontroller 3 is eventually prohibited. While the error signal ERR is at the low level, the power supply IC 5 does not monitor the abnormality notification signals AOUT and BOUT received from the microcontroller 3, in other words, the monitoring of the abnormality notification signals AOUT and BOUT is inactive.

The operation shown after time t1 in FIG. 4 is not changed even when the microcontroller 3 detects the calculation-function abnormality in the calculation diagnosis of the operation diagnosis during the operation and changes the abnormality notification signal BOUT transmitted to the power supply IC 5 from the high level to the low level at time t1 in FIG. 4. The switching of the error signal ERR to the low level by the power supply IC 5 is executed substantially simultaneously with the switching of the reset signal RST to the low level. However, the present invention is not limited thereto, and the switching of the error signal ERR to the low level may be executed within a period in which the reset signal RST is at the low level.

When the hold time TH from a timing of switching of the reset signal RST to the low level has elapsed, the power supply IC 5 returns the reset signal RST to the high level as shown at time t2 in FIG. 4. That is, the reset of the microcontroller 3 is released. This operation is executed in step S230 of FIG. 3.

When the reset is released, the microcontroller 3 starts the process illustrated in FIG. 2 and executes the initial diagnosis. When the microcontroller 3 does not detect an abnormality in the initial diagnosis, that is, when the microcontroller 3 determines that the operation of the microcontroller 3 is normal, the microcontroller 3, at time t3 in FIG. 4, changes the two abnormality notification signals AOUT and BOUT transmitted to the power supply IC 5 to the high level from the low level that is the initial value set due to the reset. This operation is executed in step S160 of FIG. 2.

Further, the microcontroller 3 outputs the first watchdog signal WD to the power supply IC 5 as shown at time t4 in FIG. 4. This operation is executed in step S170 of FIG. 2.

Then, the power supply IC 5 detects that the first watchdog signal WD is output, and returns the error signal ERR from the low level to the high level. This operation is executed in step S260 of FIG. 3.

When the error signal ERR received from the power supply IC 5 becomes at the high level, the communication output from the ECU 1 is permitted. Further, the power supply IC 5 returns to a state of monitoring the abnormality notification signals AOUT and BOUT received from the microcontroller 3, in other words, the monitoring of the abnormality notification signals AOUT and BOUT becomes active.

In the present embodiment, the microcontroller 3 corresponds to a controller in the present disclosure, the power supply IC 5 corresponds to a monitoring unit in the present disclosure, and the watchdog signal WD corresponds to a "predetermined signal indicating a normal operation" in the present disclosure. Further, outputting any one of the abnormality notification signals AOUT and BOUT at a low level corresponds to outputting the abnormality notification signal in the present disclosure.

The above-described embodiment provides the following effects.

In the ECU 1, after the reset of the microcontroller 3 by the power supply IC 5 is released, the microcontroller 3 executes the initial diagnosis that is a self-diagnosis immediately after activation, determines that the microcontroller 3 is normal in the initial diagnosis, and then outputs the first watchdog signal WD indicating the normal operation to the power supply IC 5. The power supply IC 5 prohibits the communication output to the other ECUs 15 and 17 by the operation of the microcontroller 3 at least until the first watchdog signal WD is output from the microcontroller 3 after start of the reset of the microcontroller 3. After confirming that the first watchdog signal WD is output from the microcontroller 3, the power supply IC 5 permits the communication output.

Therefore, after the release of the reset of the microcontroller 3, it is confirmed in the initial diagnosis of the microcontroller 3 that the microcontroller 3 can normally operate. Then, the communication output to the other ECUs 15 and 17 due to the operation of the microcontroller 3 is permitted.

Therefore, indefinite communication output to the other ECUs 15 and 17 can be reduced at the time of activation caused by the release of the reset of the microcontroller 3.

As a comparative example, for example, it is assumed that the power supply IC 5 is configured to permit the communication output by setting the error signal ERR to the high level at the same time as the release of the reset of the microcontroller 3 or immediately after the release. That is, in FIG. 4, it is assumed that the error signal ERR received from the power supply IC 5 is set to the high level at time t2 or immediately after time t2.

In the case of this assumed configuration, at the time when the error signal ERR is set to the high level, the microcontroller 3 may have not yet completed the initial diagnosis and may be abnormal. If an abnormality is detected in the initial diagnosis of the microcontroller 3, the communication output can be permitted even though the microcontroller 3 is abnormal. Therefore, an indefinite transmission signal output from the microcontroller 3 may be transmitted from the transceiver 7 to the other ECUs 15 and 17, which may interfere with control in the vehicle.

On the other hand, according to the ECU 1 of the present embodiment of the disclosure, since the communication output to the other ECUs 15 and 17 is permitted after the microcontroller 3 is confirmed to be capable of normally operating, the transmission of an indefinite signal can be reduced.

After the microcontroller 3 determines that the microcontroller 3 is normal in the initial diagnosis, the microcontroller 3 outputs one of the abnormality notification signals AOUT and BOUT at the low level when an abnormality is detected in the operation diagnosis (i.e., voltage diagnosis or calculation diagnosis) periodically performed during the operation of the microcontroller 3. Then, after permitting the communication output, the power supply IC 5 monitors the abnormality notification signals AOUT and BOUT received from the microcontroller 3. When any one of the abnormality notification signals AOUT and BOUT is output at the low level, the power supply IC 5 determines that the reset condition is satisfied and resets the microcontroller 3.

Therefore, it is possible to realize highly reliable monitoring of the microcontroller 3. More specifically, the operation diagnosis executed by the microcontroller 3 is considered to be highly reliable after the microcontroller 3 is confirmed in the initial diagnosis to be capable of normally operating. The microcontroller 3 can be reset when an abnormality is detected in the operation diagnosis considered to be highly reliable.

When an abnormality is detected in the initial diagnosis, the microcontroller 3 stops activation and does not output the watchdog signal WD. Then, when the watchdog signal WD is not output from the microcontroller 3 until the specified time elapses after the release of the reset of the microcontroller 3, the power supply IC 5 resets the microcontroller 3 again.

Therefore, when an abnormality occurs in the microcontroller 3, an indefinite communication output can be reduced, and an attempt to return the microcontroller 3 to the normal operation can be attempted.

Although the embodiment of the present disclosure has been described above, the present disclosure is not limited to the embodiment described above, and various modifications can be made to implement the present disclosure.

For example, the watchdog signal WD output from the microcontroller 3 may be a pulse signal having no data value. In this case, the power supply IC 5 may be configured to determine whether a condition, in which the watchdog signal WD is not level-inverted within a time limit, is satisfied instead of the condition (c) as the reset condition.

The microcontroller 3 may be configured to execute only one of the voltage diagnosis or the calculation diagnosis as the operation diagnosis. In this case, one of the abnormality notification signals AOUT, BOUT may be omitted. In addition, when the first watchdog signal WD is determined to be output in step S240 of FIG. 3, the power supply IC 5 may determine whether an additional predetermined condition is satisfied. When the additional predetermined condition is determined to be satisfied, the power supply IC 5 may proceed to step S260 of FIG. 3.

A microcontroller that executes the same function as the power supply IC 5 may be realized by a microcontroller different from the microcontroller 3.

The ECU 1 and the methods described in the present disclosure may be implemented by a dedicated computer provided by configuring a processor and memory programmed to perform one or more functions embodied by a computer program. Alternatively, the ECU 1 and the method described in the present disclosure may be implemented by a dedicated computer provided by configuring a processor with one or more dedicated hardware logic circuits. Alternatively, the ECU 1 and the method described in the present disclosure may be implemented by one or more dedicated computers configured by combinations of processors and memories programmed to perform one or more functions and processors configured by one or more hardware logic circuits. The computer program may also be stored on a computer readable non-transitory tangible recording medium as instructions to be executed by a computer. The method for realizing the functions of the respective units included in the ECU 1 does not necessarily need to include software, and all of the functions may be realized by use of one or more hardware.

A plurality of functions of one element in the above embodiment may be implemented by a plurality of elements, or one function of one element may be implemented by a plurality of elements. In addition, multiple functions of multiple components may be realized by one component, or a function realized by the multiple components may be realized by one component. In addition, a part of the configuration of the above embodiment may be omitted.

The present disclosure may be implemented, in addition to the ECU 1 described above, various forms such as a system including the ECU 1 as a component, a program for causing a computer to function as the ECU 1, a non-transitory tangible storage medium including a semiconductor memory storing the program, a method for prohibiting a communication output in the control device.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A control device comprising:
a first circuitry configured to execute a process for communicating with at least another device; and
a second circuitry configured to transmit a reset signal to the first circuitry to execute a reset of the first circuitry when a predetermined reset condition relating to the first circuitry is satisfied, wherein
the first circuitry is further configured to
stop and then activate based on the rest signal,
execute an initial diagnosis, which is a self-diagnosis immediately after activation of the first circuitry, the initial diagnosis including determining whether an operation of the first circuitry is normal, and output a predetermined signal indicating a normal operation of the first circuitry to the second circuitry when the operation of the first circuitry is determined to be normal in the initial diagnosis, and the second circuitry is further configured to prohibit a communication output caused by the operation of the first circuitry to the other device during at least a time period from transmission of the reset signal to the first circuitry to receipt of the predetermined signal from the first circuitry, and permit the communication output based on the receipt of the predetermined signal.

2. The control device according to claim 1, wherein:

the first circuitry is further configured to execute periodically an operation diagnosis, which is a self-diagnosis during an operation of the first circuitry, when the operation of the first circuitry is determined to be normal in the initial diagnosis, and output an abnormality notification signal to the second circuitry when the operation of the first circuitry is determined to be abnormal in the operation diagnosis, and the second circuitry is further configured to determine whether the abnormality notification signal has been received from the first circuitry after permitting the communication output, and determine that the reset condition is satisfied when the abnormality notification signal is determined to have been received.

3. The control device according to claim 1, wherein:

the first circuitry is further configured not to output the predetermined signal when the operation of the first circuitry is determined to be abnormal in the initial diagnosis, and the second circuitry is further configured to transmit the reset signal to the first circuitry to reset the first circuitry when the second circuitry has not received the predetermined signal from the first circuitry until a specified time elapses since the activation of the first circuitry.

4. A method for prohibiting a communication output in a control device including a first circuitry and a second circuitry, the method comprising:

transmitting a reset signal from the second circuitry to the first circuitry to execute a reset of the first circuitry when a predetermined reset condition relating to the first circuitry is satisfied, stopping and then activating the first circuitry based on the reset signal, executing, by the first circuitry, an initial diagnosis of the first circuitry which is a self-diagnosis immediately after activation of the first circuitry, the initial diagnosis including determining whether an operation of the first circuitry is normal, outputting, from the first circuitry to the second circuitry, a predetermined signal (WD) indicating a normal operation of the first circuitry to the second circuitry when the operation of the first circuitry is determined to be normal in the initial diagnosis, prohibiting, by the second circuitry, the communication output caused by the operation of the first circuitry to another device during at least a time period from transmission of the reset signal to the first circuitry to receipt of the predetermined signal from the first circuitry, and permitting, by the second circuitry, the communication output based on the receipt of the predetermined.

* * * * *